Nov. 14, 1933.                G. TRICAU                1,935,339
        SHOCK ABSORBING DEVICE FOR APPLIANCES, SUCH
          PARTICULARLY AS AIRCRAFT PARACHUTES
                Filed May 21, 1932       5 Sheets-Sheet 1
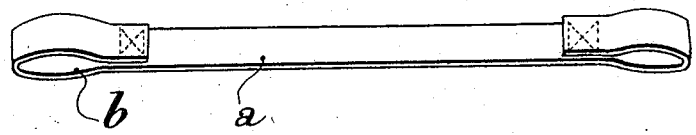
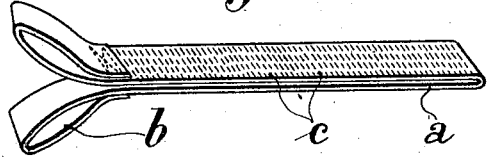
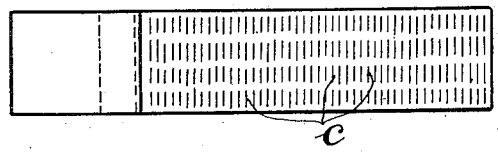
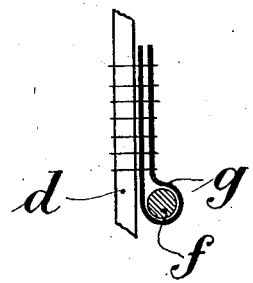
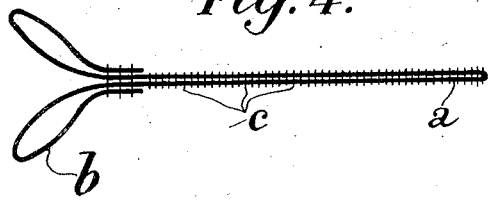
Gabriel Tricau
Inventor
by Louis Barnett
Attorney Nov. 14, 1933.  G. TRICAU  1,935,339
SHOCK ABSORBING DEVICE FOR APPLIANCES, SUCH
PARTICULARLY AS AIRCRAFT PARACHUTES
Filed May 21, 1932   5 Sheets-Sheet 2
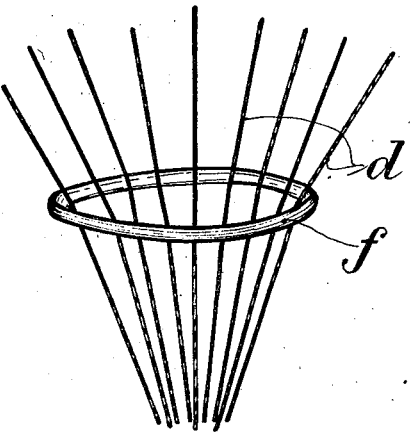
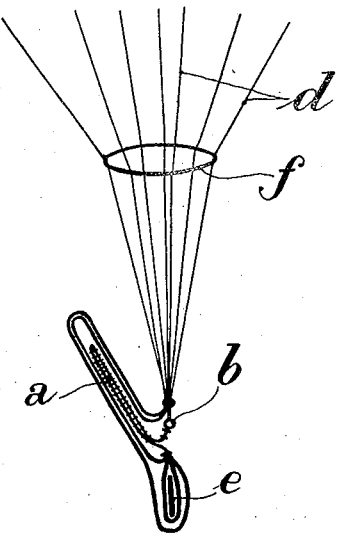

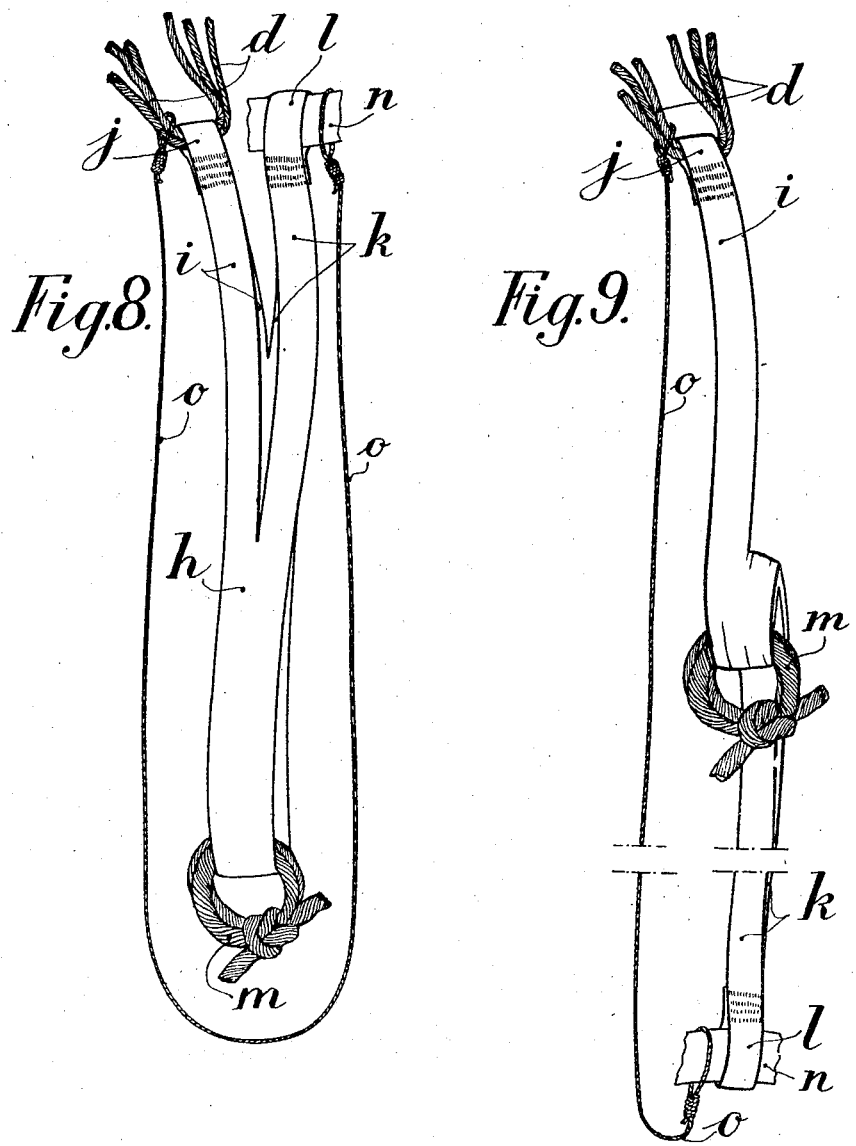

Nov. 14, 1933.  G. TRICAU  1,935,339
SHOCK ABSORBING DEVICE FOR APPLIANCES, SUCH
PARTICULARLY AS AIRCRAFT PARACHUTES
Filed May 21, 1932  5 Sheets-Sheet 4

Gabriel Tricau
Inventor
By Louis Barnett
Attorney

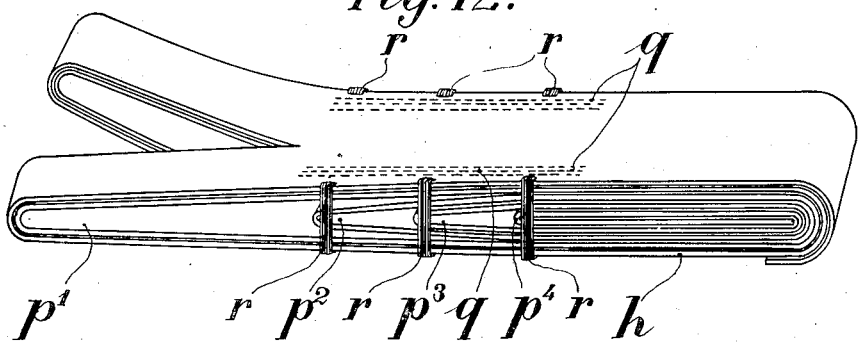
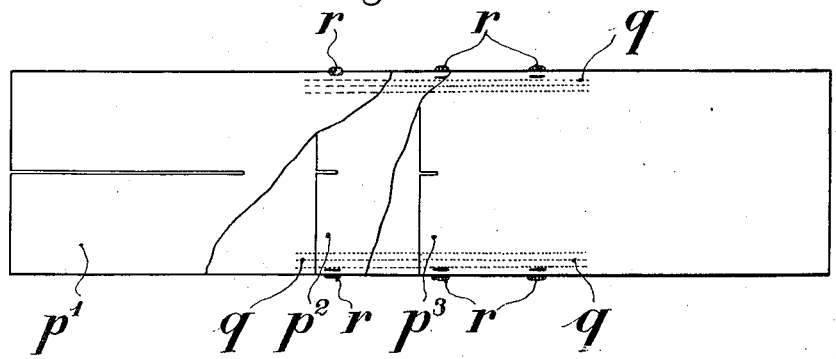

Patented Nov. 14, 1933

1,935,339

UNITED STATES PATENT OFFICE 1,935,339

SHOCK-ABSORBING DEVICE FOR APPLIANCES, SUCH PARTICULARLY AS AIRCRAFT PARACHUTES

Gabriel Tricau, Vanves, France

Application May 21, 1932, Serial No. 612,685, and in Luxemburg May 28, 1931

8 Claims. (Cl. 244—21)

This invention relates to shock absorbing devices used in appliances, such as aircraft parachutes, for absorbing the shock to which the load being transported by an appliance is subjected, as for example, when the sail of a parachute opens.

The said load after being thrown in space with the parachute to which it is attached, results in a free fall and acquires a certain speed. Upon opening of the sail of said parachute, its fall is so suddenly braked or retarded that it receives a very violent shock. The degree of severity of the shock is directly proportional to the duration of the period of free fall and the mass of the load.

The invention has for its object the provision of shock absorbing devices of the above mentioned type, which are constructed to efficiently absorb the shocks arising from the very rapid braking caused by the opening of the sails of said appliances.

In the accompanying drawings:

Figs. 1, 2, 3 and 4 are views, shown partly diagrammatic, of a shock absorbing device part comprising a strap constructed to embody the invention. These figures illustrate, respectively, the progressive steps taken in the manufacture of said strap.

Fig. 5 is a fragmentary perspective view, shown partly diagrammatic, of a complementary shock absorbing means positioned on the shroud lines of a parachute embodying the invention.

Fig. 6 is a fragmentary sectional view, shown partly diagrammatic, of the resilient ring secured to the parachute shroud lines.

Fig. 7 is a fragmentary perspective view, shown partly diagrammatic, of the shock absorbing device and complementary means applied to the shroud lines of a parachute.

Fig. 8 is a fragmentary perspective view, shown partly diagrammatic, of a shock absorbing device in an initial position, the rupture elements of said device being constituted of weft threads comprising a suitably formed strap.

Fig. 9 is a fragmentary perspective view, similar to Fig. 8, showing the device after operation and ripping of a portion of the rupture elements.

Figure 10:
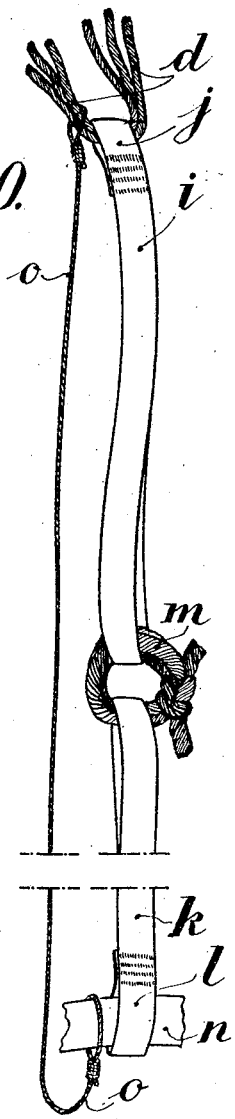
Fig. 10 is a fragmentary perspective view, shown partly diagrammatic and similar to Figs. 8 and 9, after operation and complete ripping of the rupture elements.
Figure 11:
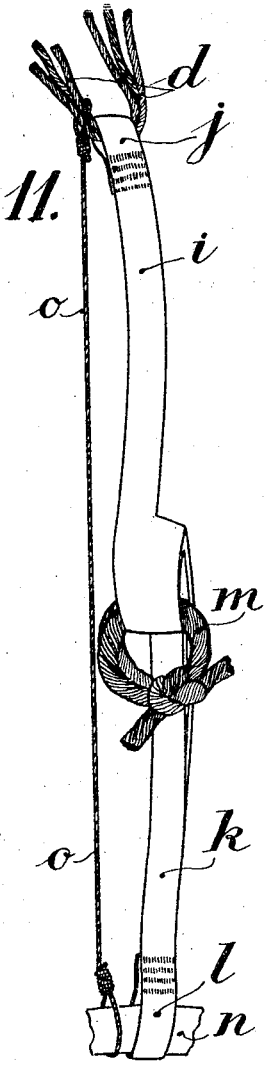

Fig. 11 is a fragmentary perspective view, shown partly diagrammatic and similar to Figs. 8, 9 and 10, but including a safety cable for limiting the ripping of the shock absorbing strap to avoid the complete rupture thereof, and Figs. 12 and 13 are perspective and plan views, respectively, of a shock absorbing device embodying the invention showing a modified form of rupture elements thereof having weft threads and comprising a suitably formed strap.

Accordingly, the invention provides a shock absorbing device adapted to be interposed between the load suspension means of the sail and the load itself in the following manner:

There is provided a strap $a$, five centimeters wide, for example, having two loops $b$ formed one at each end.

The strap $a$ is folded back on itself and rows of stitches $c$ of silk twist or the like are made with a sewing machine in the direction of the weft.

These rows of stitches $c$ may be spaced apart two millimeters and several hundred of them are provided.

One of the loops $b$ of the strap $a$ is tied to the shroud lines $d$ and the belt $e$ of the parachutist is passed through the other of said loops.

This shock absorbing device thus constituted and interposed between the shroud lines and the belt of the parachutist, operates as follows:

When the parachute opens in use, a shock is transmitted to the strap between the loops thereof and causes the rows of stitches to be ruptured in succession. Each row of stitches on being ruptured, absorbs a portion of the shock and if the resistance of each stitch to rupture and the number of rows of stitches are sufficient, the user will finally hang from the shroud lines of the parachute without being subjected to any appreciable shock.

Thus, by using an ample number of rows of stitches to assure sufficient resistance, the shock can be readily reduced to any desired degree and can practically be eliminated.

As shown in Figs. 5, 6 and 7, the mid-portion of the shroud lines $d$ of the parachute are held together in a gathered position by means of a resilient ring $f$, the latter embracing the shroud lines $d$ and bending them. Said resilient ring $f$ is held in the position shown in Figs. 5 and 7 by means of small loops $g$ as shown in detail in Fig. 6, said loops $g$ being made of braid and sewed to the shroud lines $d$. The ring $f$ is subjected to a tension stress by the action of the shroud lines in receiving a shock and thereupon exerts a pull on the shroud lines and compels each to support a part of the shock. Said ring thereby relays the effect of the successive shock on the rupturing elements. The action of the resilient ring $f$ causes:

(a) The shock determining the ripping of the first element to be ruptured to resemble a shock exerted on two perfectly resilient bodies;

(b) The distribution of the load on all the shroud lines;

(c) The successive effects on the rupture elements to resemble the effect of a continuous force.

In order to provide a shock absorbing device of the character described above, but adapted to insure a more rapid yet a very gradual braking action, the modified form of the invention may be adapted by using a strong strap $h$, ten centimeters wide for example, made of woven hemp, flax, silk or other suitable material.

In one end of this strap, a slot about thirty centimeters long for example, is formed in the direction of the warp and at the middle portion of the strap, that is to say, by cutting the weft threads. At the other end of the strap, a similar slot is formed, but longer, for example forty centimeters long.

As shown in Fig. 8, the strap $h$ is folded back on its self, by placing both ends one over the other. A loop $j$ is formed with the two left-hand halves $i$ of the strap, by folding them and by firmly sewing together the four strap thickness thus obtained. A loop $l$, similar to loop $j$ above described, is formed with the two right-hand halves $k$ of the strap, and, at the middle and all around the folded strap, a strop $m$, having for instance three turns, is formed by means of a rope made of silk or of any other material of suitable strength.

The shock absorbing device thus devised is attached to the parachute and user as shown in Figs. 8 to 11, inclusive, in the following manner:

The belt $n$ of the parachutist is passed through one of the loops of the strap $h$, for instance the loop $l$, and the free end of the shroud lines $d$ of the sail is attached to the other loop $j$.

Being thus attached to the parachute, the said device operates as follows:

After the parachutist has jumped overboard, or after the fall of the load, when the sail opens, the shroud lines $d$ of the sail are stretched. The strap $h$ secured, on the one hand, to the belt $n$ of the parachutist, is torn, thus absorbing the shock produced by the opening of the sail, first slightly, then more effectively when the rent caused to the first or shorter slot makes the latter equal to the second or longer slot.

If the shock is sufficiently powerful for completely tearing the strap, the latter is divided into two parts which are connected end to end by the strop $m$ and will sustain the user as shown in Fig. 10.

When the shock is insufficient to effect the complete tearing of the strap, its unripped mid-portion will sustain the user as shown in Fig. 9.

In order to ensure greater security, it is advisable to add to this shock absorbing device auxiliary means, such as a rope or cable $o$ of suitable strength, said means being connected, on the one hand, to the shroud lines, and on the other hand, to the belt $n$ of the parachutist, so that in case of complete rupture of the shock absorbing device, that is, both the strap $h$ and the strop $m$, the parachutist would still be suspended by the cable $o$.

Where a severe shock is to be absorbed, use can be made of two straps instead of one, and in the second strap slots can be formed as in the first strap, but of greater length, so as to cause the weft threads to successively come into action. With two straps, four successive stages of resistance can be provided.

When a cable $o$ connecting the shroud lines to the belt of the parachutist is used, it is made of such a length that it comes into action and effectively supports the parachutist before the strap $h$, serving as the shock absorbing device, is completely torn apart. (See Fig. 11.) The final shock, occurring when the said strap $h$ is completely torn apart, is then eliminated.

It is to be noted that, in the first form of construction of the shock absorbing device provided with rupture elements, that is to say, the device shown in Figs. 1, 2, 3 and 4, the rupture elements offer, at every instant during the operation, an approximately constant resistance, whilst in the second form of construction, that is to say that shown in Figs. 8, 9 and 10, the rupture elements offer, at every instant during the operation, a progressive resistance in several stages. In the latter case, for an equal initial resistance, the braking action is much more rapid owing to the fact that as the resistance increases, it becomes sooner equal to the force being balanced. If a longer period of braking action was desired, the same can be effected by the use of rupture elements of increasing degrees of strength.

In order to provide a shock absorbing device of the above mentioned type which also is adapted to ensure a very rapid and very progressive braking, the following construction may be used.

A strap $h$ of suitable length, made of silk, for example, has the warp threads in its middle portion suitably spaced apart.

This strap $h$ is folded by winding it several times on itself, so as to obtain (as shown in Fig. 12) loops $p^1$, $p^2$, $p^3$, $p^4$, the last of these loops, i. e. the loop $p^4$, being double.

The strap $h$ is slit at its middle portion in the direction of the warp threads (by cutting the weft threads) at the ends of the said loops. This is done in such a way that the slot formed at the double loop $p^4$ terminates at a suitable distance from the loop $p^3$ and that the slot formed at each of the loops $p^3$, $p^2$, and $p^1$ constitutes, so to speak, the beginning of a slot made of unequal length on each of both sides of the said loops.

The loops $p^1$, $p^2$, $p^3$, $p^4$ are sewn together by a suitable number of rows of stitches $q$, made in a suitable manner, and fastening edge stitches $r$ may also be provided to firmly hold the various loops together.

The double loop $p^4$ forms, owing to the slot provided therein, two loops. The belt of the parachutist is passed through one of these loops, and the ends of the shroud lines of the sail are passed through the other loop. As has previously been described, to the shock absorbing device thus constituted, there may be added an auxiliary safety cable.

What I claim as my invention and desire to secure by Letters Patent is:—

1. A shock absorbing device for aircraft parachute having in combination a means rigid with the suspension means used for suspending the load from the sail, a means integral with the load itself, and stitches connecting the means integral with the shroud lines and the means integral with the load, these two means being constituted by a folded strap having two loops.

2. A shock absorbing device for aircraft parachute having in combination a means rigid with the suspension means used for suspending the load from the sail, a means integral with the load itself, and rupture elements constituted by the weft threads of a slotted strap, these threads having a resistance which increases as their distance from the bottom of the slot increases.

3. A shock absorbing device for aircraft parachute having in combination a means rigid with the suspension means used for suspending the load from the sail, a means integral with the load itself, and rupture elements constituted by the weft threads of a folded strap wound several times on itself so as to form loops of different size, this strap being slit at its middle portion, in the direction of the warp threads, at the ends of the said loops.

4. In combination, a parachute having shroud lines and a shock absorbing device therefor, said device having means for attachment to the parachute and means for attachment of the same to a load, and a resilient ring embracing the shroud lines of the parachute and means for holding said ring to said shroud lines.

5. In combination, a parachute and a shock absorbing device therefor, said device comprising a strap folded upon itself and having its adjacent portions united by a multiplicity of threads constituting a series of rupturable elements, one portion being attached to the parachute and the other portion having means for attachment to a load.

6. A shock absorbing device for aircraft parachutes, comprising a folded strap, a closed ring passing through the folded end of the strap, the other end of the strap being slotted to divide the strap into two adjacent portions, one of said portions being connected to the parachute, the other portion having means for attachment to a load, and the weft threads of the strap constituting a multiplicity of rupturable elements.

7. A shock absorbing device for aircraft parachutes, comprising a strap having two longitudinal parts, one of said parts being connected to the parachute and the other part having means for attachment to the load, said parts being longitudinally severable by the rupture of the weft threads of the strap.

8. A shock absorbing device for aircraft parachutes, comprising a strap having two longitudinal parts, one of said parts being connected to the parachute and the other part having means for attachment to the load, said parts being longitudinally severable by the rupture of the weft threads of the strap, and means for permanently uniting the two parts.

GABRIEL TRICAU.